United States Patent
Stepanski et al.

(10) Patent No.: US 10,199,041 B2
(45) Date of Patent: Feb. 5, 2019

(54) SPEECH RECOGNITION SYSTEMS AND METHODS FOR MAINTENANCE REPAIR AND OVERHAUL

(71) Applicant: HONEYWELL INTERNATIONAL INC., Morristown, NJ (US)

(72) Inventors: Joe Stepanski, Phoenix, AZ (US); Lorene Tussey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/585,242

(22) Filed: Dec. 30, 2014

(65) Prior Publication Data

US 2016/0189709 A1    Jun. 30, 2016

(51) Int. Cl.
| | |
|---|---|
| *G10L 15/22* | (2006.01) |
| *G10L 15/26* | (2006.01) |
| *G06F 17/24* | (2006.01) |
| *G06F 17/30* | (2006.01) |
| *G10L 15/18* | (2013.01) |
| *G10L 15/28* | (2013.01) |
| *G10L 25/48* | (2013.01) |
| *B64F 5/60* | (2017.01) |
| *B64F 5/40* | (2017.01) |
| *G06Q 10/00* | (2012.01) |

(52) U.S. Cl.
CPC ............... *G10L 15/22* (2013.01); *B64F 5/40* (2017.01); *B64F 5/60* (2017.01); *G06F 17/243* (2013.01); *G06F 17/30778* (2013.01); *G10L 15/1822* (2013.01); *G10L 15/26* (2013.01); *G10L 15/28* (2013.01); *G10L 25/48* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 5,365,050 A | * | 11/1994 | Worthington | ...... G06K 7/10881 235/462.49 |
| 5,583,801 A | * | 12/1996 | Croyle | ............... G01R 31/2834 702/115 |
| 5,924,069 A | | 7/1999 | Kowalkowski et al. | |

(Continued)

OTHER PUBLICATIONS

EP extended search report for Application No. 15200976.7-1910 dated Apr. 26, 2016.

(Continued)

*Primary Examiner* — Jialong He
(74) *Attorney, Agent, or Firm* — Lorenz & Kopf, LLP

(57) ABSTRACT

Methods and systems are provided for capturing information associated with a component of a system during a maintenance procedure. In one embodiment, a method includes: managing a dialog with a user via a wearable device based on a pre-defined dialog file, wherein the pre-defined dialog file is defined for at least one of a component and a procedure; receiving speech signals at the wearable device based on the dialog; processing the speech signals by the wearable device to identify component information; and transmitting the component information from the wearable device to a host component for use by a maintenance application. The managing, receiving, and transmitting are performed during a maintenance procedure.

8 Claims, 5 Drawing Sheets

(56) References Cited

U.S. PATENT DOCUMENTS

| | | | |
|---|---|---|---|
| 5,995,936 A | 11/1999 | Brais et al. | |
| 6,185,535 B1 | 2/2001 | Hedin et al. | |
| 6,321,198 B1* | 11/2001 | Hank | H04M 3/4936 704/270 |
| 6,356,437 B1* | 3/2002 | Mitchell | G06F 1/163 342/352 |
| 6,394,278 B1* | 5/2002 | Reed | B07C 3/00 209/44.4 |
| 6,505,162 B1* | 1/2003 | Wang | G10L 15/22 704/270 |
| 6,510,414 B1* | 1/2003 | Chaves | H04M 3/51 379/88.01 |
| 6,728,676 B1 | 4/2004 | Ortega | |
| 6,996,528 B2* | 2/2006 | Morin | G10L 15/22 704/254 |
| 7,035,774 B2* | 4/2006 | Fujiwara | H04L 67/04 340/504 |
| 7,143,042 B1* | 11/2006 | Sinai | G10L 15/22 704/270.1 |
| 7,240,010 B2 | 7/2007 | Papadimitriou et al. | |
| 7,676,092 B2 | 3/2010 | Lagardere et al. | |
| 7,721,301 B2 | 5/2010 | Wong et al. | |
| 7,729,919 B2* | 6/2010 | Wang | G06F 8/67 704/270 |
| 7,739,117 B2* | 6/2010 | Ativanichayaphong | G06F 17/243 704/231 |
| 7,869,998 B1* | 1/2011 | Di Fabbrizio | G10L 13/00 704/1 |
| 7,953,597 B2* | 5/2011 | Ativanichayaphong | G06F 17/243 704/235 |
| 7,996,002 B2* | 8/2011 | Sweeney | G06Q 10/087 455/422.1 |
| 8,125,405 B2 | 2/2012 | Dove et al. | |
| 8,229,745 B2* | 7/2012 | Ativanichayaphong | G10L 15/193 704/10 |
| 8,230,362 B2* | 7/2012 | Couch | G01M 17/00 382/190 |
| 8,370,157 B2 | 2/2013 | Boregowda et al. | |
| 8,468,023 B1 | 6/2013 | Stracke, Jr. | |
| 8,543,404 B2 | 9/2013 | Moore et al. | |
| 8,600,761 B2 | 12/2013 | Marsh et al. | |
| 8,718,242 B2* | 5/2014 | Bangalore | G06Q 10/06311 345/179 |
| 8,831,894 B2 | 9/2014 | Papadimitriou et al. | |
| 2002/0062216 A1* | 5/2002 | Guenther | G06F 3/167 704/270.1 |
| 2005/0164684 A1* | 7/2005 | Chen | G05B 19/0423 455/414.1 |
| 2006/0064302 A1* | 3/2006 | Ativanichayaphong | G06F 17/243 704/235 |
| 2007/0080930 A1* | 4/2007 | Logan | G06Q 10/06 345/156 |
| 2007/0100583 A1 | 5/2007 | Yano et al. | |
| 2007/0213988 A1 | 9/2007 | Hanson | |
| 2007/0293997 A1* | 12/2007 | Couch | G01M 17/00 701/31.4 |
| 2009/0216534 A1* | 8/2009 | Somasundaram | G06F 19/322 704/251 |
| 2009/0281993 A1* | 11/2009 | Hadley | G06F 17/30011 |
| 2009/0312052 A1* | 12/2009 | Barbosa | G06Q 10/06 455/556.1 |
| 2010/0004933 A1* | 1/2010 | Sweeney | G06Q 10/087 704/260 |
| 2010/0076760 A1* | 3/2010 | Kraenzel | G10L 15/26 704/235 |
| 2010/0125379 A1* | 5/2010 | Fournier | G06Q 10/06 701/3 |
| 2010/0125460 A1* | 5/2010 | Mellott | G10L 15/22 704/270.1 |
| 2010/0223067 A1 | 9/2010 | Giles et al. | |
| 2010/0304783 A1 | 12/2010 | Logan et al. | |
| 2011/0282687 A1 | 11/2011 | Koll | |
| 2012/0054593 A1* | 3/2012 | Naderi | G06F 17/243 715/224 |
| 2012/0066600 A1* | 3/2012 | Nickel | G06F 3/0481 715/727 |
| 2012/0323574 A1* | 12/2012 | Wang | G10L 15/22 704/246 |
| 2013/0047111 A1* | 2/2013 | Couch | G01M 17/00 715/771 |
| 2013/0204619 A1 | 8/2013 | Berman et al. | |
| 2013/0238312 A1* | 9/2013 | Waibel | G10L 15/00 704/8 |
| 2013/0339030 A1* | 12/2013 | Ehsani | G10L 17/005 704/275 |
| 2014/0056173 A1* | 2/2014 | Nakamura | H04L 69/18 370/254 |
| 2015/0325047 A1* | 11/2015 | Conner | G06T 19/006 345/633 |
| 2016/0083118 A1* | 3/2016 | Mahalingaiah | B64F 5/0045 701/32.1 |

OTHER PUBLICATIONS

EP Examination Report for Application No. 15200976.7-1910 dated Apr. 1, 2017.
EP Summons to Oral Proceedings for Application No. 15200976.7 dated Nov. 20, 2017.

* cited by examiner

SPEECH RECOGNITION SYSTEMS AND METHODS FOR MAINTENANCE REPAIR AND OVERHAUL

TECHNICAL FIELD

The present disclosure generally relates to methods and systems for capturing information about a component of a system.

BACKGROUND

During maintenance repair and overhaul of an aerospace product, specific data must be recorded. Conventional methods require collecting large amounts of data based on knowledge and/or via a hardcopy check list. The collection process is typically a multistep process of writing down the information and then entering the information into informational screens on a computer. To ensure accuracy, multiple reviews are required while collecting large strings of data and in many cases multiple recordings on paper and computer. Such a process is redundant and wastes motion and time in recording, re-recording, and reviewing the data.

Hence, there is a need for improved systems and methods for capturing the information about components during maintenance repair and overhaul. Other desirable features and characteristics will become apparent from the subsequent detailed description and the appended claims, taken in conjunction with the accompanying drawings and the foregoing technical field and background.

BRIEF SUMMARY

Methods and systems are provided for capturing information associated with a component of a system during a maintenance procedure. In one embodiment, a method includes: managing a dialog with a user via a wearable device based on a pre-defined dialog file, wherein the pre-defined dialog file is defined for at least one of a component and a procedure; receiving speech signals at the wearable device based on the dialog; processing the speech signals by the wearable device to identify component information; and transmitting the component information from the wearable device to a host component for use by a maintenance application. The managing, receiving, and transmitting are performed during a maintenance procedure.

In another embodiment, a system includes: a maintenance application of a host computer; and a wearable device in communication with the host computer. The wearable device is configured to: manage a dialog with a user based on a pre-defined dialog file, wherein the pre-defined dialog file is defined for at least one of a component and a procedure; receive speech signals from the wearable device based on the dialog; process the speech signals to identify component information; and transmit the component information to the host component for use by the maintenance application.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
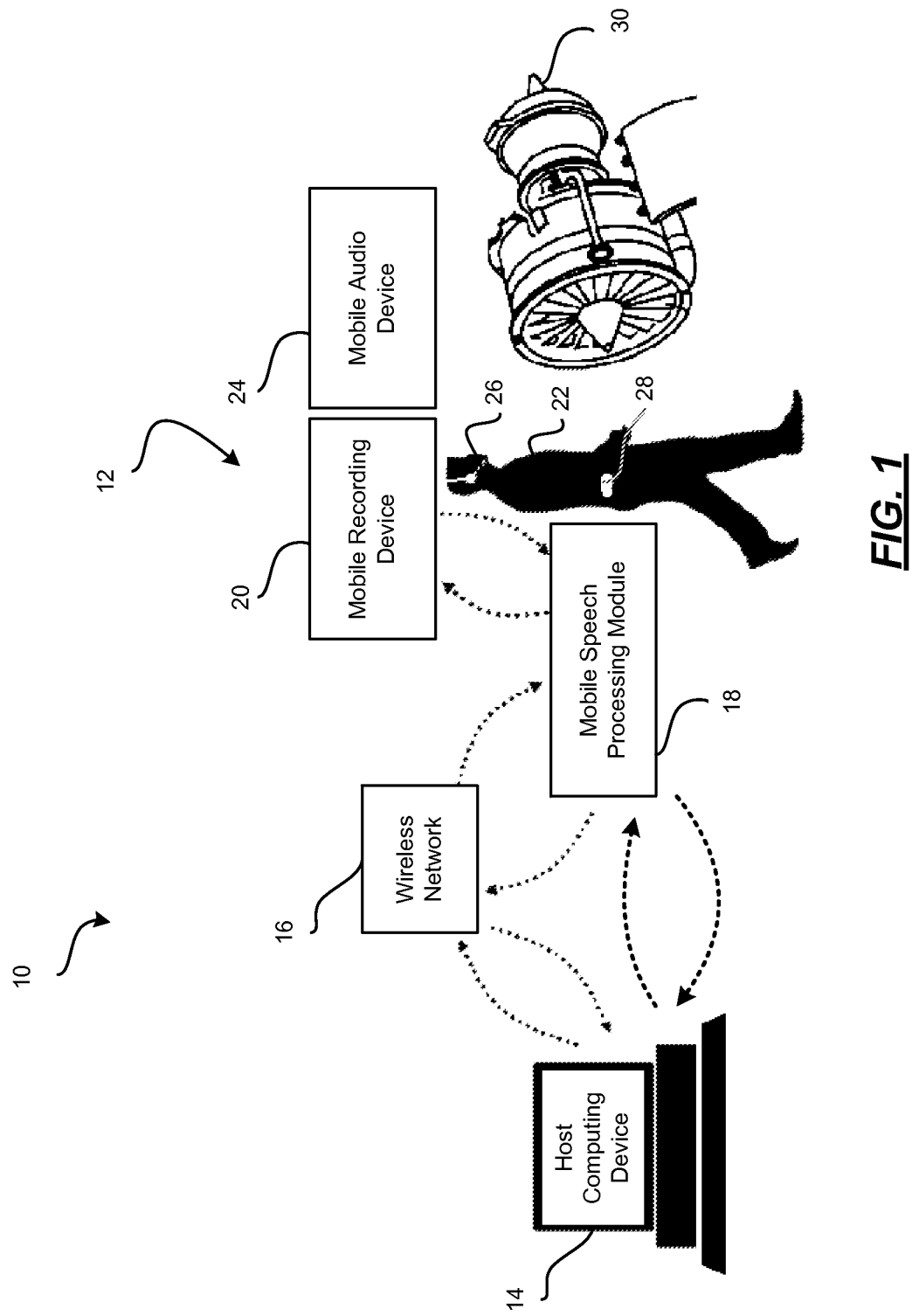
FIG. 1 is an illustration of a maintenance repair and overhaul system that includes a mobile speech processing system in accordance with exemplary embodiments.

Referring now to FIG. 1, exemplary embodiments of the present disclosure are directed to a maintenance repair and overhaul system shown generally at 10 that includes a mobile speech processing system shown generally at 12. As can be appreciated, the maintenance repair and overhaul system 10 can be implemented for maintenance repair and overhaul of any components such as, but not limited to, a vehicle component, an aerospace component, and a watercraft component. For exemplary purposes, the disclosure will be discussed in the context of the maintenance repair and overhaul system 10 for the maintenance repair and overhaul of an aircraft component such as an engine gas turbine or other component.

Turning now to FIG. 1 in greater detail, the exemplary maintenance repair and overhaul system 10 generally includes the mobile speech processing system 12 that communicates with a host computing device 14. The mobile speech processing system 12 communicates wirelessly with the host computing device 14 either directly according to a short range wireless communication protocol (e.g., Bluetooth, or other protocol), or indirectly via a wireless network 16 and according to a long rage wireless communication protocol (e.g., Wi-Fi, or other protocol).

The mobile speech processing system 12 generally includes a mobile speech processing module 18. The mobile speech processing module 18 receives speech signals from a mobile recording device 20. For example, the mobile recording device 20 records speech uttered by a user 22 and provides the recorded speech as speech signals to the mobile speech processing module 18. The mobile speech processing module 18 generates audio output via a mobile audio device 24. For example, the mobile speech processing module 18 provides audio signals to the mobile audio device 24 and the mobile audio device 24 plays the audio to the user 22.

In various embodiments, the mobile speech processing module 18, the mobile recording device 20, and the mobile audio device 24 may be implemented as a single wearable device 26 or, alternatively, as multiple wearable devices 26, 28 that communicate wirelessly and/or in a wired manner. The wearable device(s) 26, 28 is mobile in that it is free to be transported about an environment such as a repair and overhaul environment. The wearable device(s) 26, 28 may be implemented as, but not limited to, a headset, a watch, a bracelet, a ring, a necklace, an article of clothing, a shoe, or any other device that is wearable by a user.

In operation, the user 22 speaks information about a component 30 (e.g., a gas turbine engine of an aircraft) that is currently undergoing overhaul and/or repair. The mobile recording device 20 records the user's speech. The mobile speech processing module 18 obtains the information about the particular component 30 based on the recorded speech signals. The user 22 is prompted to speak the information about the component 30 by the mobile speech processing module 18. The mobile speech processing module 18 selects the appropriate prompt based on a pre-defined dialog. The pre-defined dialog is defined according to a process flow that is specific to a particular component, and/or specific to a particular maintenance repair or overhaul procedure. The prompts can include speech that requests particular information from the user 22, speech that confirms particular information spoken by the user 22, and speech that suggests an instruction of repair or overhaul to the user 22.

Once the information is captured, the mobile speech processing module 18 either automatically or after being prompted by the user 22, wirelessly transmits the captured information to the host computing device 14. As can be appreciated, the information can be transmitted input by input, as batches of inputs, or altogether depending on how and when the transmission takes place. The host computing device 14 receives the information and populates a host maintenance repair and overall application with the information.

Figure 2:
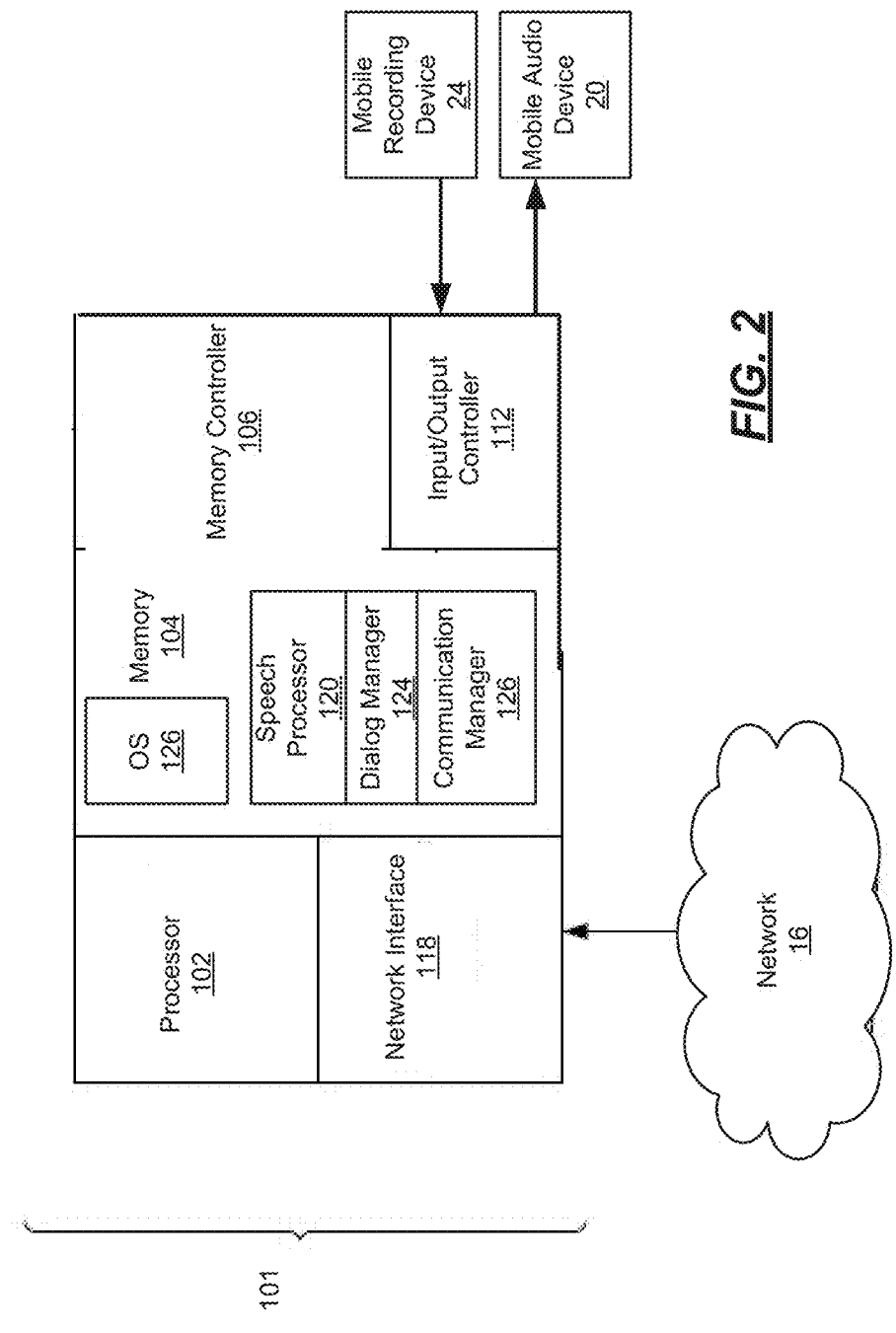
FIGS. 2 and 3 are functional block diagrams illustrating components of the maintenance repair and overhaul system in accordance with exemplary embodiments.

Turning now to FIG. 2, the mobile speech processing module 18 is shown in greater detail. The mobile speech processing module 18 is shown to include a processing device 101 that includes one or more processors 102, memory 104 coupled to a memory controller 106, and one or more input/output controllers 112. In various embodiments, the input/output controllers 112 are coupled to the mobile recording device 20 and the mobile audio device 24. In various embodiments, the processing device 101 can further include one or more network interfaces 118 for coupling to one or more wireless networks 16.

In various embodiments, the memory 104 stores instructions that can be performed by the processor 102. The instructions stored in memory 104 may include one or more separate programs, each of which comprises an ordered listing of executable instructions for implementing logical functions. When the processing device 101 is in operation, the processor 102 is configured to execute the instructions stored within the memory 104, to communicate data to and from the memory 104, and to generally control operations of the processing device 101 pursuant to the instructions. The processor 102 can be any custom-made or commercially available processor, a central processing unit (CPU), an auxiliary processor among several processors associated with the processing device 101, a semiconductor based microprocessor (in the form of a microchip or chip set), a macroprocessor, or generally any device for executing instructions.

In the example of FIG. 2, the instructions stored in the memory 104 include an operating system (OS) 120, a speech processor 122, a dialog manager 124, and a communication manager 126. As can be appreciated, the speech processor 122, the dialog manager 124, and the communication manager 126 may be implemented as a combined set of instructions or as separate sets of instructions as shown.

In general, the operating system 120 essentially controls the performance of computer programs and provides scheduling, input-output control, file and data management, memory management, and communication control and related services. The speech processor 122 receives the recorded speech signals (i.e., provided by the input/output controller 112) and processes the recorded speech signals according to one or more speech processing techniques to identify the information spoken by the user. The speech recognition techniques may include, but are not limited to, a combination of commercially off the shelf translation tools using standard language models modified with Aerospace derived vocabulary. In various embodiments, the speech processing techniques can be speaker dependent. That is, the techniques and calibration files used to process the speech are dependent upon the speaker speaking.

Figure 4:
FIG. 4 is an exemplary form of the maintenance repair and overhaul system in accordance with various embodiments.

The dialog manager 124 stores a plurality of pre-defined dialog files 125. Each dialog file includes one or more instructions and one or more audio files that store prompts for carrying on a dialog with the user in order to capture needed information. The one or more instructions and one or more audio files are defined according to a defined process flow. The process flow is specific to the component and/or the procedure to be performed on the component. For example, in one embodiment, the process flow may be defined to follow the format of an information form that is to be filled out during the maintenance procedure such as the exemplary partial form 300 shown in FIG. 4. The form 300 includes a plurality of fields that require information. The process flow defines how to obtain the information for the fields in a manner that is most appropriate for the component. For example, the order of the dialog prompts may not necessarily follow the order of the fields in the form 300, rather, the order of the dialog prompts may be defined to follow the accessibility of the information according to the procedure being performed on the component.

With reference back to FIG. 2, the dialog manager 124 retrieves one of the pre-defined dialog files 125 based on a user selected component and/or procedure. The dialog manager 124 executes the instructions of the pre-defined dialog file 125 such that the appropriate prompts can be played (e.g., via the audio files) and the identified information from the speech processor 122 can be stored.

The communication manager 126 communicates the stored information to the host computing device 14. The communication manager 126 communicates the stored information based on a prompt from the user and/or communicates the information once it determines that processing of the pre-defined dialog is complete.

Figure 3:
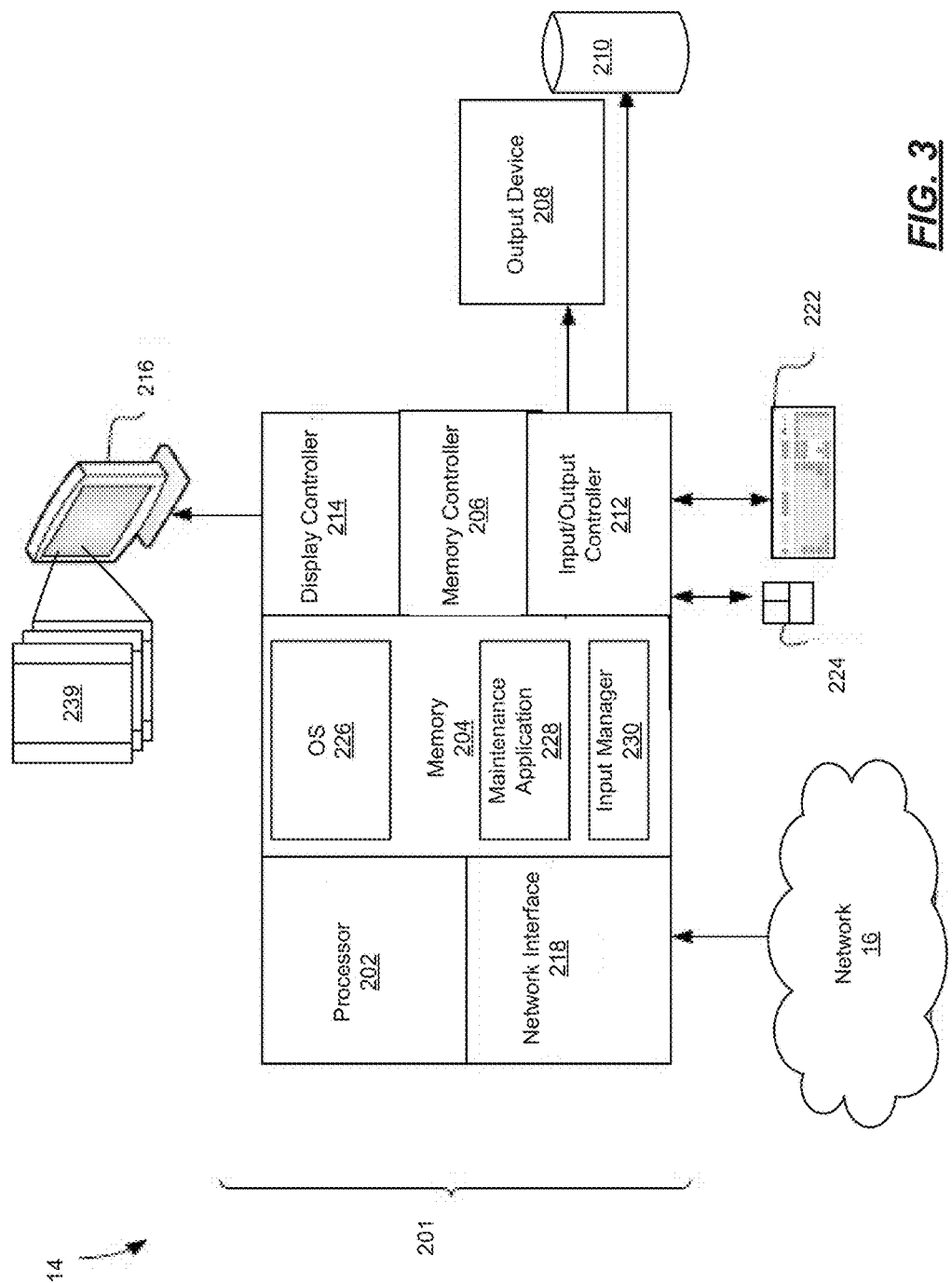

Turning now to FIG. 3, the host computing device 14 is shown in greater detail. The exemplary host computing device 14 is shown to include a computer 201. As can be appreciated, the computer 201 can be any computing device, including but not limited to, a desktop computer, a laptop, a server, a portable handheld device, or any other electronic device, or a number of networked devices. For exemplary purposes, the disclosure will be discussed in the context of the computer being a single server.

The computer 201 is shown to include one or more processors 202, memory 204 coupled to a memory controller 206, one or more input and/or output (I/O) devices 208, 210 (or peripherals) that are communicatively coupled via a local input/output controller 212, and a display controller 214 coupled to a display 216. In an exemplary embodiment, a conventional keyboard 222, and a mouse 224, and any other input devices can be coupled to the input/output controller 212. In an exemplary embodiment, the host computing device 14 can further include one or more network interfaces 218 for coupling to one or more wireless networks 16.

In various embodiments, the memory 204 stores instructions that can be performed by the processor 202. The instructions stored in memory 204 may include one or more separate programs, each of which comprises an ordered listing of executable instructions for implementing logical functions. When the computer 201 is in operation, the processor 202 is configured to execute the instructions stored within the memory 204, to communicate data to and from the memory 204, and to generally control operations of the computer 201 pursuant to the instructions. The processor 202 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions.

In the example of FIG. 3, the instructions stored in the memory 204 include an operating system (OS) 226, a maintenance application 228, and an input manager 230. As can be appreciated, in various other embodiments, all or parts of the maintenance application 228 can be implemented on a separate storage medium (not shown) or other computing system (not shown), such as another server or other computing device, and can communicate with the computer 201. For exemplary purposes, the disclosure will be discussed in the context of the systems all being implemented entirely on the computer 201.

In general, the operating system 226 controls the performance of computer programs and provides scheduling, input-output control, file and data management, memory management, and communication control and related services. The input manager 230 receives the information that was transmitted by the mobile speech processing module 18 (FIG. 2), processes the information, and provides the information to the maintenance application 228. In particular, the input manager 230 receives the information and provides the information to the maintenance application 228 such that the information can be associated with particular fields of a maintenance form (e.g., the exemplary form 300 shown in FIG. 4). For example, the information can be tagged with maintenance form field identifications so that the information can be returned to the maintenance form field The maintenance application 228 receives the information and populates the appropriate field with the appropriate information. The maintenance application 228 may manage a user interface 239 for display by the display 216 or display of a remote system (not shown). The user interface 239 displays the captured information. For example, the user interface 239 displays the form including the captured information in appropriate field.

Figure 5:
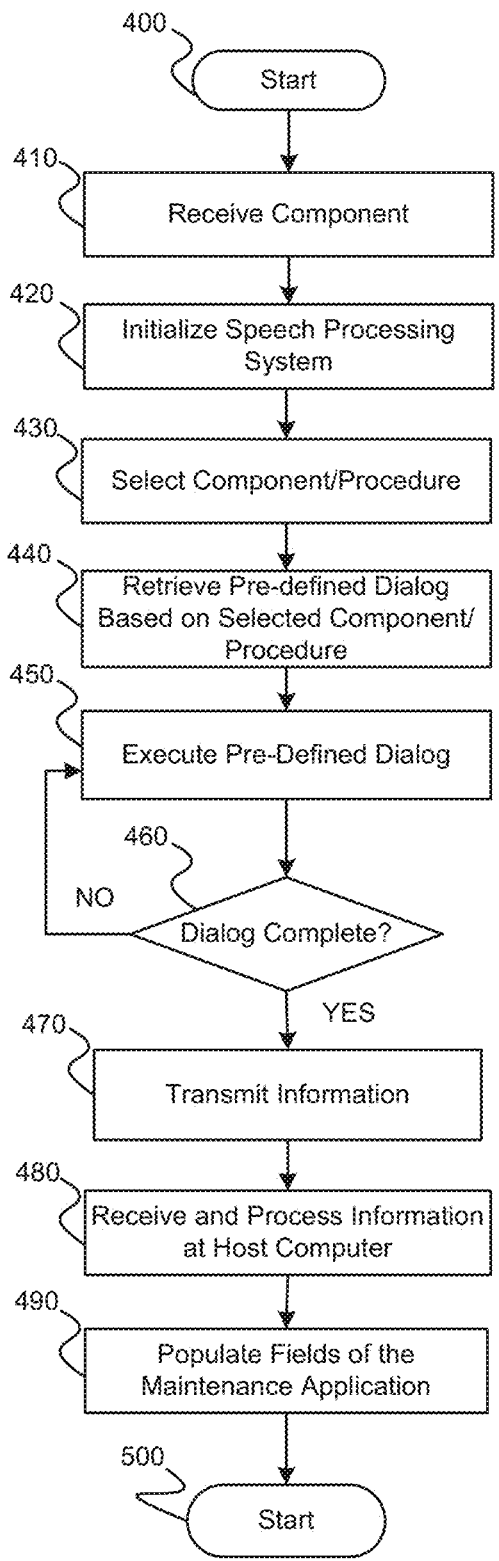
FIG. 5 is a flowchart illustrating a method that may be performed by the maintenance repair and overhaul system in accordance with exemplary embodiments.

Referring now to FIG. 5 and with continued reference to FIGS. 1-4, the illustrated flowchart depicts a method that can be performed by the maintenance repair and overhaul system 10 in accordance with various embodiments. As can be appreciated in light of the disclosure, the order of operation within the methods is not limited to the sequential execution as illustrated in FIG. 5, but may be performed in one or more varying orders as applicable and in accordance with the present disclosure.

In one example, the method may begin at 400. The component 30 is received for repair or overhaul at 410. The mobile speech processing system 12 is initialized (e.g., turned on and any other startup procedures are performed) at 420. The component and/or procedure is selected by the user at 430, for example, by the user speaking the component name or number and/or a name or number associated with the repair or overhaul procedure, the mobile recording device 20 recording the speech, and the mobile speech processing module 18 processing the recorded speech according to one or more speech recognition techniques. The mobile speech processing module 18 retrieves a pre-defined dialog (e.g., from a plurality of pre-stored dialogs) based on the selected component and/or procedure at 440.

Thereafter, the mobile speech processing module 18 executes the instructions of the pre-defined dialog at 450-460. In particular, the mobile speech processing module 18 generates audio signals to request particular information from the user 22, to confirm particular information spoken by the user 22, and/or to command an instruction of repair or overhaul to the user 22, processes the speech signals in response to the audio signals to identify the information, and stores the identified information.

Once the dialog is complete at 460, the stored information is transmitted wirelessly to the host computing device 14 at 470 (e.g., either automatically or based upon a user prompt to transmit). The input manager 230 receives the transmitted information, processes the transmitted information, and provides the information for population of the appropriate field to the maintenance application 228. The maintenance application 228 stores the information in the appropriate fields at 490. Thereafter, the method may end at 500.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of identifying information associated with one or more components of a system during a maintenance procedure, comprising:
    using a wearable device by a user for management of a dialog wherein the dialog is managed based on a pre-defined dialog file which has been selected from a plurality of stored pre-defined dialog files wherein a selection of the pre-defined dialog is made by identifying information processed in the maintenance procedure performed by the user using the wearable device wherein a selected pre-defined dialog file is configured in first and second pre-defined file process flow wherein a first pre-defined file process flow according to a filling out of information of an information form during the maintenance procedure to identify information of a component, and in a second pre-defined file process flow to follow the accessibility of the information according to the maintenance procedure being performed on the component, the management of the dialog further comprising:
    receiving speech signals at the wearable device from dialog of the user comprising: information associated with one or more components for the maintenance procedure;
    processing the speech signals of the dialog by speech recognition techniques at the wearable device to identify the information of a component comprising the steps of:
        retrieving the pre-defined dialog file from the plurality of stored pre-defined dialog files based on the information of the component;
        executing a set of instructions of the pre-defined dialog file to generate and process audio signals comprising the steps of: requesting maintenance information from the user, confirming maintenance information spoken by the user, commanding an instruction to the user, and processing the maintenance information spoken which is in response by the user to generated audio signals;
    transmitting the maintenance information from the wearable device to a host computer for use by a maintenance application;
    receiving the maintenance information at the host computer;
    providing the maintenance information to the maintenance application; and
    populating fields of a form of the maintenance application with the maintenance information.

2. The method of claim 1, wherein the transmitting is performed automatically.

3. The method of claim 1, wherein the transmitting is performed upon completion of the dialog.

4. The method of claim 1, wherein the transmitting is performed upon receipt of a signal requesting to transmit.

5. A system of identifying information associated with a component of a system during a maintenance procedure, comprising:
    a maintenance application of a host computer;
    a wearable device in communication with the host computer, wherein the wearable device is configured to:
        manage a dialog wherein the dialog is managed based on a pre-defined dialog file which has been selected from a plurality of stored pre-defined dialog files wherein a selection of the pre-defined dialog is made by identifying information processed in the maintenance procedure performed by a user using the wearable device wherein a selected pre-defined dialog file is configured in first and second pre-defined file process flow wherein a first pre-defined file process flow according to a filling out of information of an information form during the maintenance procedure to identify information of a component, and in a second pre-defined file process flow to follow the accessibility of the information according to the maintenance procedure being performed on the component, the wearable device to manage the dialog further configured to:

receive speech signals at the wearable device from dialog of the user comprising: information associated with one or more components for the maintenance procedure;

process the speech signals of the dialog by speech recognition techniques at the wearable device based on information of the component comprising the steps to:

retrieve the pre-defined dialog file from the plurality of stored pre-defined dialog files based on the information of the component, and execute a set of instructions of the pre-defined dialog file to generate and process audio signals comprising the steps of: to request maintenance information from the user, to confirm maintenance information spoken by the user, to command an instruction to the user, and to process the maintenance information spoken which is in response by the user to generated audio signals; and transmit the maintenance information to the host computer for use by the maintenance application;

wherein the maintenance application is configured to:

receive the maintenance information; and populate fields of the information form of the maintenance application with the maintenance information.

6. The system of claim 5, wherein the wearable device transmits the maintenance information automatically.

7. The system of claim 5, the wearable device transmits the maintenance information upon completion of the dialog.

8. The system of claim 5, the wearable device transmits the maintenance information upon receipt of a signal requesting to transmit.

* * * * *